Dec. 13, 1955     F. G. BUONGIRNO     2,726,850
HINGED RADIATING FIN FOR HEATING PIPES
Filed Feb. 12, 1952
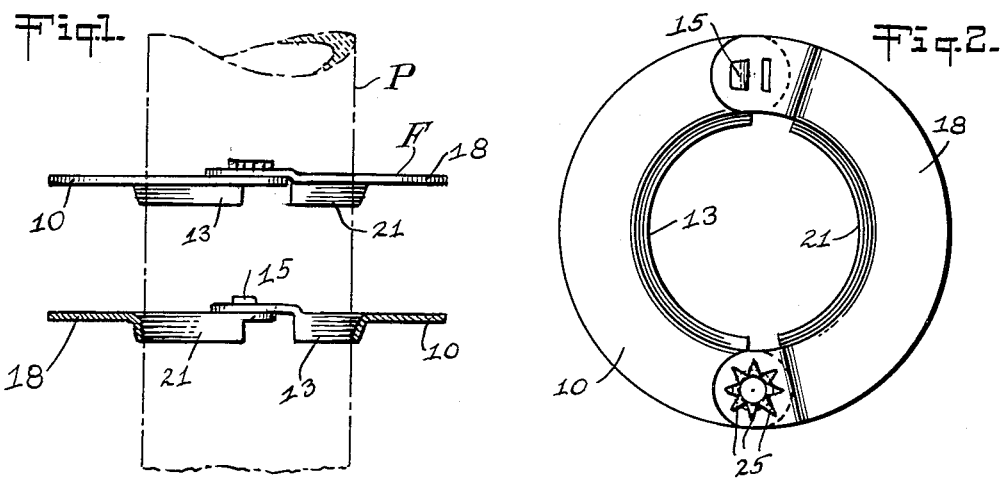
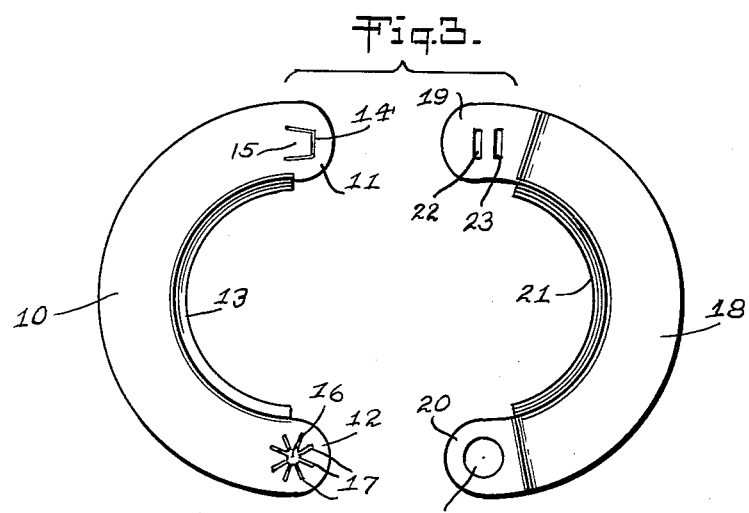
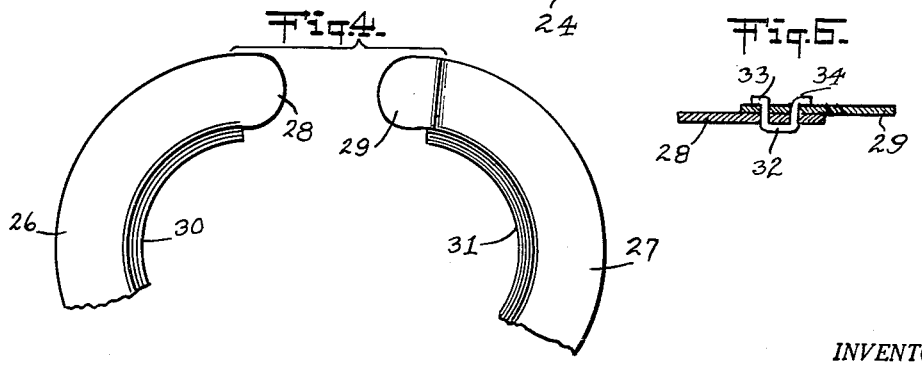
INVENTOR.
Frank G. Buogirno
BY H. G. Manning
Attorney

United States Patent Office 2,726,850
Patented Dec. 13, 1955

2,726,850

HINGED RADIATING FIN FOR HEATING PIPES

Frank G. Buongirno, Wallingford, Conn.

Application February 12, 1952, Serial No. 271,157

1 Claim. (Cl. 257—262.16)

This invention relates to heat exchange apparatus and more particularly to a radial fin for increasing the radiating capacity of a heating or refrigerating pipe and which may easily be applied to, adjusted upon, and removed from said pipe.

One object of this invention is to provide a radiating fin of the above nature whereby any exposed heating or refrigerating pipe may easily be converted to an efficient radiator.

Another object is to provide a device of the above nature which will be adjustable to embrace pipes of different sizes, and which will make efficient heat-conducting contact wtih any pipe to which it is applied.

Another object is to provide a device of the above nature which will be simple in construction, inexpensive to manufacture, easy to install and manipulate, compact, ornamental in appearance, and very efficient and durable in use.

With these and other objects in view there have been illustrated on the accompanying drawing two forms in which the invention may conveniently be embodied in practice.

In the drawings:

Fig. 1 is a side view of a pipe having a pair of adjustable radiating fins assembled thereon in spaced reversed relation.

Fig. 2 is a top plan view of one of the fins shown by itself.

Fig. 3 is a top plan view in exploded relation of the two parts of the radiating fin before they are attached together.

Fig. 4 is a fragmentary view, similar to Fig. 3, of the two parts of a modified form of radiating fin.

Fig. 5 is a perspective view of the U-shaped clip employed for connecting the overlapping ends of the fin shown in Fig. 4.

Fig. 6 is a sectional view of the modified form of fin and the U-shaped clip in assembled condition.

Referring now to the drawing in which like reference numerals denote corresponding parts throughout the several views, the letter F indicates a radiating fin preferably of aluminum, embodying the present invention, which generally comprises two sections 10 and 18, as will be hereinafter more fully described. The section 10 is preferably made from a semi-circular flat strip of metal with rounded ends 11, 12, and having a concentric tapered resilient flange 13 extending therefrom and adapted to have efficient heat conductive engagement with the pipe P.

The rounded end 11 is provided with a U-shaped slot 14, within which is a tab 15 which is adapted to be bent up from the plane of said section 10 for engagement within one of the slots 22, 23 of the opposing end section 18, selectively.

The opposite rounded end 12 of the fin section 10 has a central aperture 16 from which extend a plurality (8 in this instance) of radiating slots 17, for a purpose to be hereinafter described.

The second fin section 18 is provided with rounded ends 19, 20 which are offset upwardly from the intermediate portion of said section 18.

Provision is also made of a concentric tapered flange 21, similar to the flange 13 previously mentioned, and also providing efficient heat conductive engagement with the pipe P when assembled thereto.

The rounded end 20 of the second section 18 is provided with a relatively large round hole 24 into which the eight pointed ears 25 formed by the radiating slots 17 previously mentioned may be inserted and bent over, as shown in Figs. 1 and 2.

*Operation*

In operation, it will merely be necessary to swingably connect the sections 10 and 18 together by bending the ears 25 outwardly, inserting them through the hole 24 of the section 18, and forcing them down into flat contact therewith.

When a radiator fin is to be thereafter applied to a pipe P, the body sections 10 and 18 will be embraced around said pipe and then swung inwardly in such a manner that the tapered flanges 13 and 21 will loosely embrace the pipe P. The body sections 10 and 18 will then be pressed farther toward each other with sufficient force to insure that the flanges 13, 21 make efficient heat-conductive contact with the pipe P, and assume a cylindrical curvature. The sections 10 and 18 will then be secured in rigid relationship by bending the tab 15 outwardly, selectively inserting it through the proper aperture 22, 23 according to the size of the pipe, and then bending the tab 15 downwardly into abutment with the flat surface of the rounded end 19 of the section 18, as clearly shown in Figs. 1 and 2 of the drawing.

It will be understood that the pair of slots 22, 23 permit the flat body portions 10 and 18 to be firmly attached to pipes of different sizes, and that the flexible characteristics of the flanges 13 and 21 are such that efficient heat-conductive contact between the fin and the pipe will be insured.

In the modified form of the invention (Figs. 4, 5, and 6) provision is made of a pair of semi-circular fin sections 26, 27, of relatively soft metal having four unperforated rounded ends 28, 28, 29, 29, and a pair of tapered resilient central flanges 30, 31 extending therefrom as in the first form of the invention.

In order to attach the overlapping rounded ends 28, 29 of the sections 26, 27, provision is made of a U-shaped clip 32 which is forced up through the middle of said rounded ends 28, 29 by a suitable tool, not shown. The extremities 33, 34 of the clip 32 will then be bent outwardly into abutment with the flat surface of said rounded end 29 (Fig. 6).

The invention herein disclosed will be found useful for increasing the radiating capacity of any exposed pipe, and when applied in suitable numbers to said pipe, will furnish a radiator capable of efficiently heating or cooling a room or space of substantial size.

One advantage of the present invention is that the individual radiator fins may be readily attached to and removed from the pipe, thus permitting the effective radiation of the pipe to be adjusted as desired after the pipe has been installed.

A further advantage of the radiating fin is that the radiation in any desired room may be accurately controlled and any desired number of fins may be applied by the home-owner to any smooth metallic pipe.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a radiator fin, the combination comprising a pair of flat semi-circular body sections having arcuate resilient flanged inner edges adapted to circumferentially engage a pipe in heat transferring relationship with the ends of said body sections being disposed in overlapping relationship, one pair of said ends being joined by integrally formed pivotal connecting means, the other pair of said ends being joined by integrally formed permanent connecting means, said pivotal connecting means comprising a plurality of radially disposed ears formed in one of said body sections adapted to be received in an opening provided in the other of said body sections to be bent radially outwardly to engage the margin of said opening, said permanent connecting means comprising a slot provided in the end of one of said body sections adapted to receive a tongue formed in the end of the other of said body sections.

References Cited in the file of this patent

UNITED STATES PATENTS

| | | |
|---|---|---|
| 995,691 | Latham | June 20, 1911 |
| 1,782,260 | Franquet et al. | Nov. 18, 1930 |
| 2,007,838 | Scott et al. | July 9, 1935 |
| 2,453,567 | Bronander | Nov. 9, 1948 |
| 2,574,142 | Buongirno | Nov. 6, 1951 |
| 2,624,555 | Vincenzo | Jan. 6, 1953 |

FOREIGN PATENTS

| | | |
|---|---|---|
| 643,619 | France | Oct. 18, 1927 |